(12) United States Patent
Goodart et al.

(10) Patent No.: US 7,937,501 B2
(45) Date of Patent: May 3, 2011

(54) DISPLAYPORT CE SYSTEM CONTROL FUNCTIONALITY

(75) Inventors: Joseph Edgar Goodart, Austin, TX (US); David W. Douglas, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 387 days.

(21) Appl. No.: 11/678,838

(22) Filed: Feb. 26, 2007

(65) Prior Publication Data
US 2008/0205519 A1    Aug. 28, 2008

(51) Int. Cl.
*G06F 3/00* (2006.01)
*G06F 13/42* (2006.01)

(52) U.S. Cl. ............... 710/2; 710/15; 710/38; 710/106; 710/300; 725/118; 725/143; 725/144

(58) Field of Classification Search .......... None
See application file for complete search history.

(56) References Cited

U.S. PATENT DOCUMENTS

| 6,618,773 | B1 | 9/2003 | Chang et al. .............. 710/16 |
| 7,174,411 | B1* | 2/2007 | Ngai ...................... 710/316 |
| 2004/0215953 | A1 | 10/2004 | Cantwell et al. .......... 713/2 |
| 2006/0072771 | A1 | 4/2006 | Kloiber et al. .......... 381/119 |
| 2006/0190633 | A1 | 8/2006 | Cantwell et al. ......... 710/15 |
| 2007/0016426 | A1 | 1/2007 | Hershey et al. ........... 704/277 |
| 2007/0049197 | A1 | 3/2007 | Klein ................... 455/41.2 |
| 2007/0076894 | A1 | 4/2007 | Inoue et al. ............ 381/27 |

* cited by examiner

*Primary Examiner* — Eron J Sorrell
*Assistant Examiner* — Dean Phan
(74) *Attorney, Agent, or Firm* — Hamilton & Terrile, LLP; Gary W. Hamilton

(57) ABSTRACT

An improved method and apparatus is disclosed for communicating control information between components of an audio/video system. Processing and control logic is implemented to transfer a plurality of data streams on predetermined channels of a digital video interface. A first data stream contains video data received by a video interface receiver, where it is used to generate an image on a digital display. A second data stream contains control data, which is similarly received by the video interface receiver, and is used to control source devices coupled to the digital display.

11 Claims, 5 Drawing Sheets

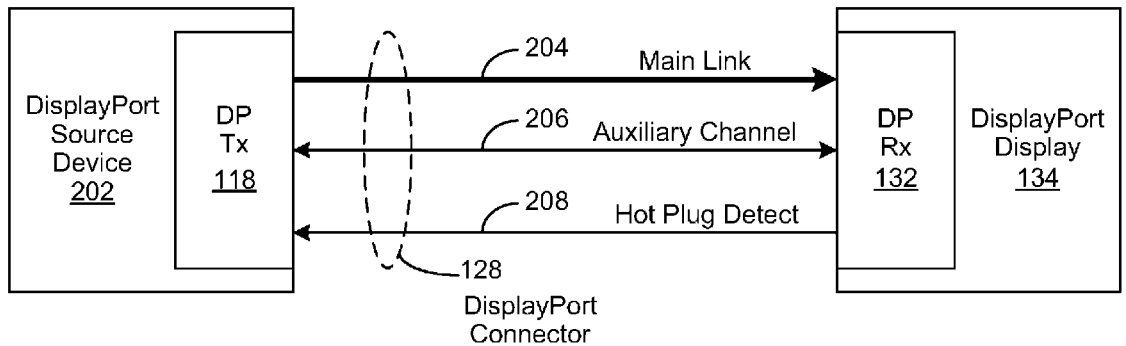
Prior Art Figure 2a
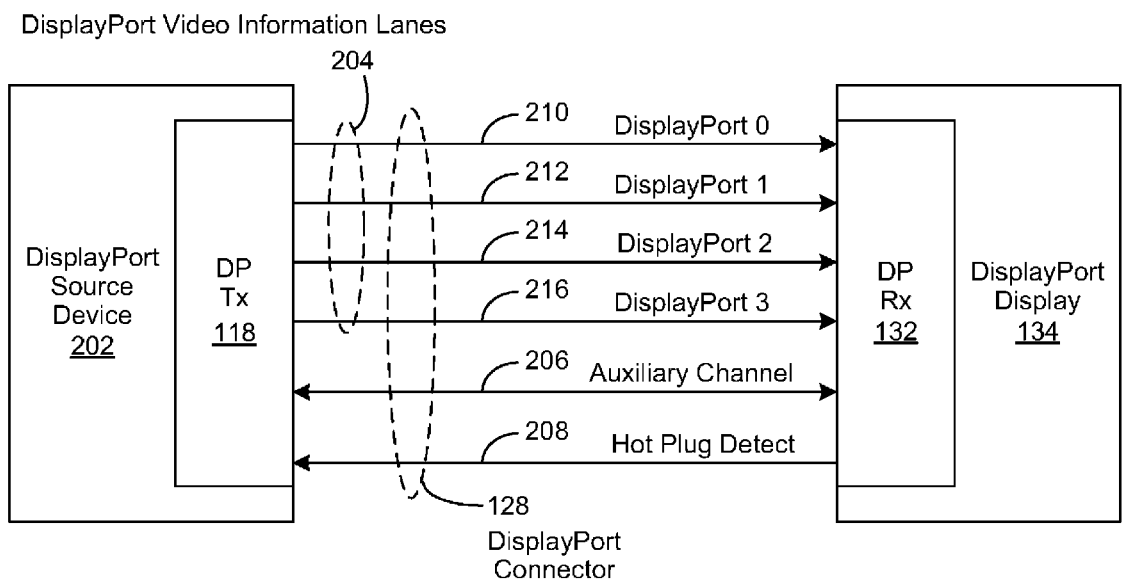
Prior Art Figure 2b

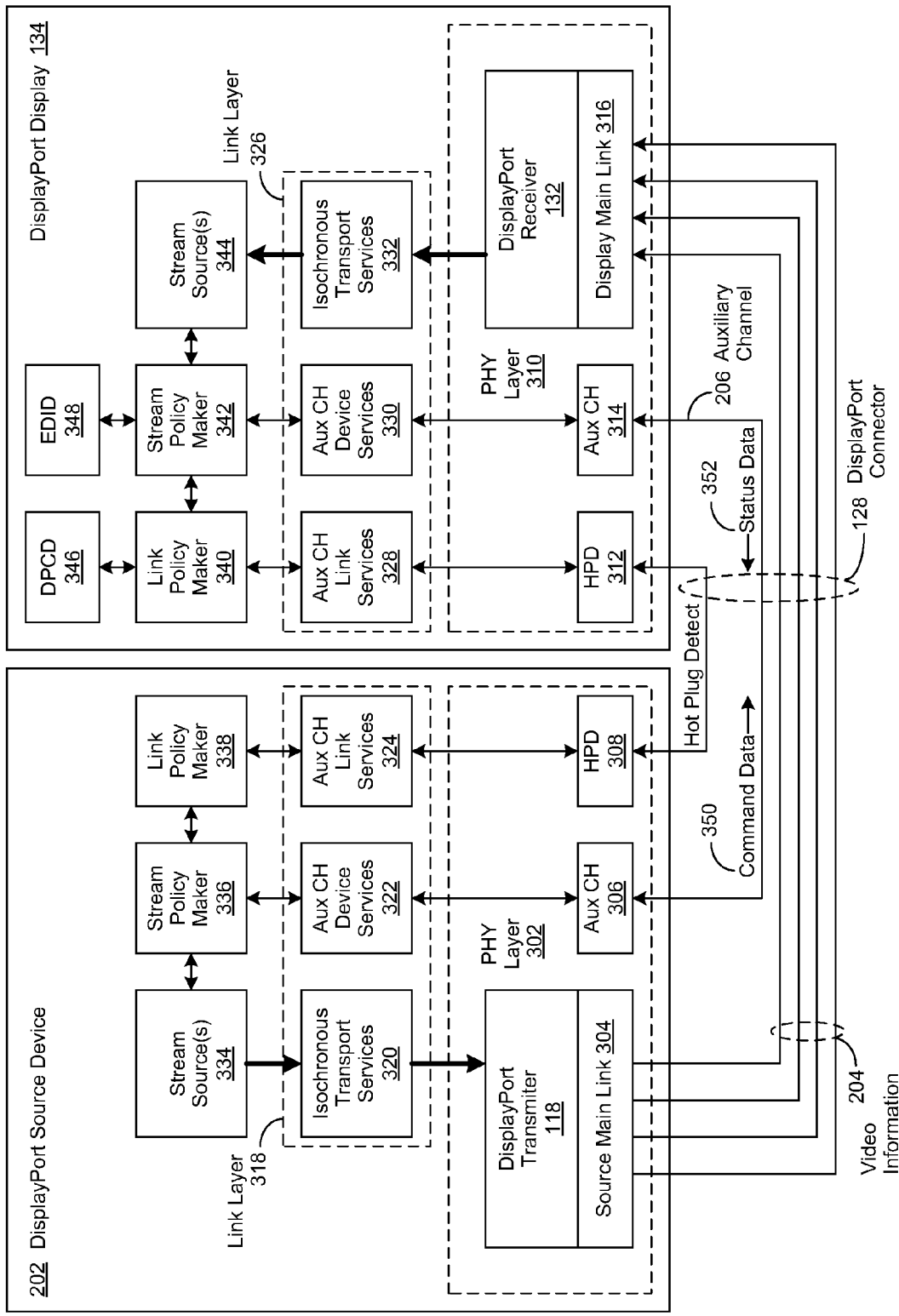
Prior Art Figure 3

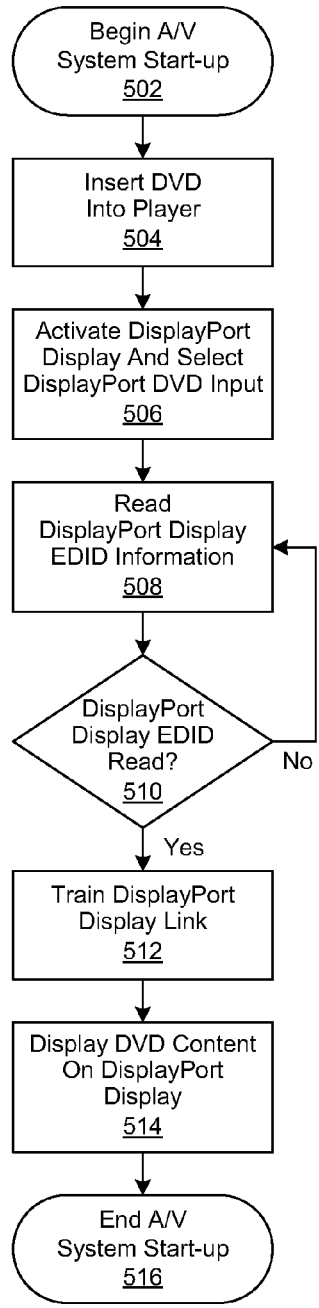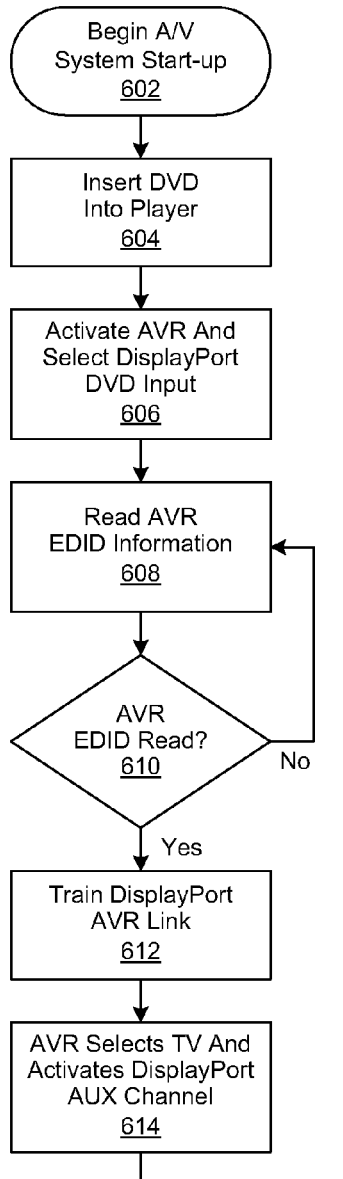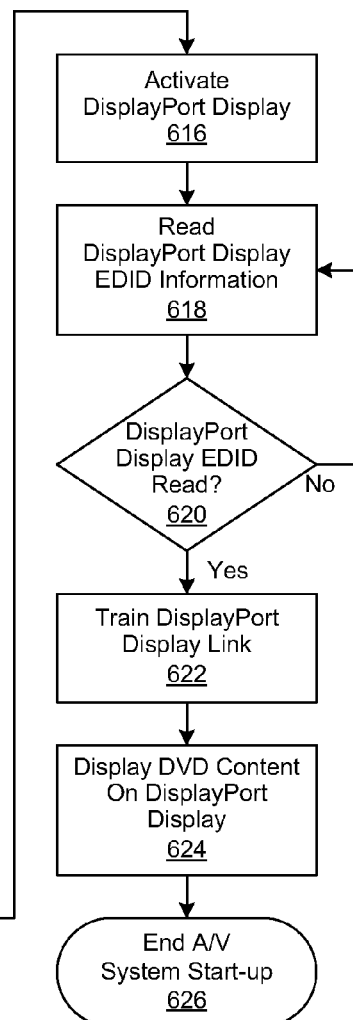
Figure 5
Figure 6

DISPLAYPORT CE SYSTEM CONTROL FUNCTIONALITY

BACKGROUND OF THE INVENTION

1. Field of the Invention

Embodiments of the invention relate generally to information handling systems. More specifically, embodiments of the invention provide an improved method and apparatus for communicating control information between components of an audio/video system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Digital displays have become increasingly popular and include flat panel screens and projectors that are used not just with information handling systems, but also with video display systems in both consumer and corporate environments. While many of these displays can accept analog signal input, their optimum resolution is best realized through a digital interface capable of mapping a video image to the native resolution of the panel. As a result, there has been a steady migration away from component RGB video analog input to digital interfaces such as digital video interface (DVI). Unlike analog interfaces which are affected by electrical noise and other sources of distortion, DVI's digital protocol uses binary data to control the desired brightness of each pixel in the display. High-Definition Multimedia Interface (HDMI) is another digital interface that is currently gaining popularity. HDMI provides a maximum bandwidth of 340 megapixels/second, which is capable of supporting the highest resolution computer monitors currently available. Furthermore, HDMI is backwards-compatible with single-link DVI implementations when an adapter cable is used.

However, computer, audio/video, and digital display manufacturers share a number of concerns regarding DVI and HDMI. First, they are concerned about future digital display bandwidth requirements, which DVI and HDMI fail to address. Second, they recognize the need to support more comprehensive encryption standards for improved digital content protection. Third, they are aware that several video standards are being implemented in parallel, which confuses consumers and complicates installations. Ideally, they would prefer a single, universal digital interface standard that uses a common, multi-purpose cable regardless of whether it is implemented for computers, audio/video (A/V) equipment, or both. These technology and market drivers have led to the development of the DisplayPort video interface by the Video Electronics Standards Association (VESA). Based on the physical (PHY) layer of the 2.5-Gbit/s PCI Express (PCIe) bus, DisplayPort is capable of providing bandwidth of up to 10.8 Gbits/sec over four channels, or "lanes."

The growing sophistication of home theater and other A/V systems is keeping pace with the evolution of digital displays, including the ability to support the bandwidth required for high definition video. These systems continue to grow in complexity and are often comprised of multiple, interconnected components, including information handling systems. For example, it is not uncommon for a consumer home theater system to include a high definition cable or satellite set-top box (STB), an audio video receiver (AVR), a digital versatile disk (DVD) player, and a media server in addition to a digital display. Generally, each of these A/V components has a separate remote control, which may or may not be programmable to control the other devices in the system. More capable universal remote controls exist, but in many cases they are so complex to program that the services of a professional are required. As a result, users are increasingly confused and frustrated by the complexity of operating these systems. One approach to addressing this issue is to use a digital video interface to convey inter-device control information between the individual components of an A/V system. This allows the activation of one component (e.g., inserting a DVD into a player) to result in the proper sequential activation of other components required to play the content. Prior art approaches include proprietary implementations of the HDMI interface, but no solution currently exists for using the VESA DisplayPort interface and MCCS Command set.

SUMMARY OF THE INVENTION

An improved method and apparatus is disclosed for communicating control information between components of an audio/video system. In selected embodiments, processing logic is implemented to transfer a plurality of data streams on predetermined channels of a digital video interface. A first data stream contains video data received by a video interface receiver, where it is used to generate an image on a digital display. A second data stream contains control data, which is similarly received by the video interface receiver, and is used to control source devices coupled to the digital display.

In these and other embodiments, control logic is implemented as command data in accordance with the Video Electronics Standards Association (VESA) DisplayPort standard. This command data comprises VESA monitor command control set (MCCS) parameters that are conveyed over the Auxiliary (AUX) channel of a DisplayPort interface.

In one embodiment, activation of a source device results in Extended Display Identification Data (EDID) read operations being performed on the digital display to retrieve its EDID information. The retrieved EDID information is then used by the source device to perform DisplayPort Configuration Data (DPCD) read operations. The DPCD read operations result in the training of the DisplayPort main link for the conveyance of video and control data between the source device and the digital display. Once the DisplayPort main link has been trained, MCCS control operations are performed that result in the activation of the digital display and selection of the originating source device without user initiation or intervention.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2a-b are simplified block diagrams illustrating an implementation of a DisplayPort Auxiliary Channel in accordance with an embodiment of the invention;

FIG. 3 is a generalized block diagram of a DisplayPort source and receiver as implemented in accordance with an embodiment of the invention to use a DisplayPort Auxiliary Channel to communicate control data;

FIG. 5 is a generalized flowchart illustrating the communication of control data between two DisplayPort devices in accordance with the present invention; and FIG. 6 is a generalized flowchart illustrating the communication of control data between a plurality of DisplayPort devices in accordance with the present invention.

DETAILED DESCRIPTION

The present invention provides an improved method and apparatus for the communication of control information between components of an audio/video system. In selected embodiments, processing logic is implemented to transfer a plurality of data streams on predetermined channels of a digital video interface. A first data stream contains video data received by a video interface receiver, where it is used to generate an image on a digital display. A second data stream contains control data, which is similarly received by the video interface receiver, and is used to control source devices coupled to the digital display. In these and other embodiments, control logic is implemented as command data in accordance with the Video Electronics Standards Association (VESA) DisplayPort standard. This command data comprises VESA monitor command control set (MCCS) parameters that are conveyed over the Auxiliary (AUX) channel of a DisplayPort interface.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
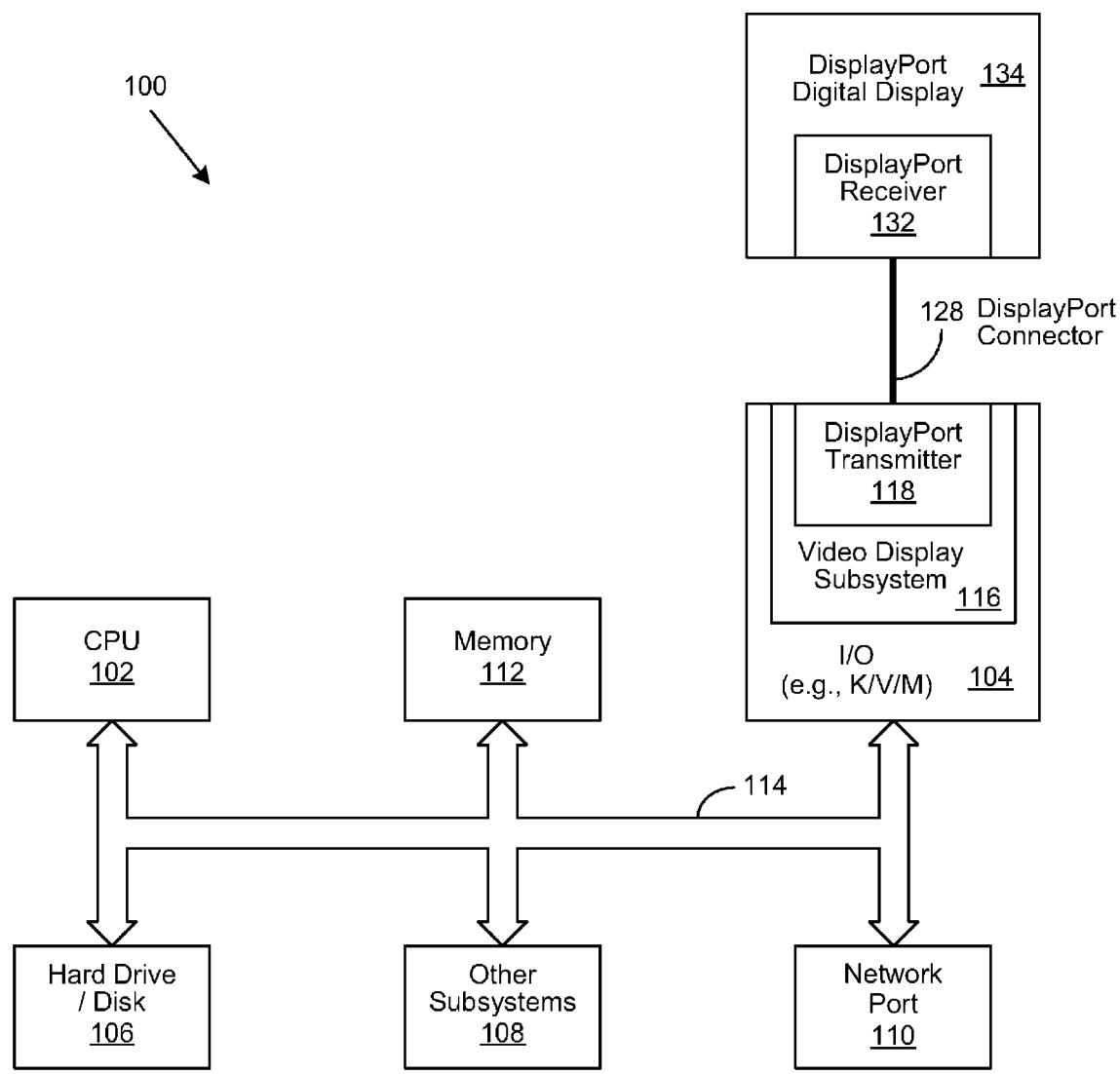
FIG. 1 is a general illustration of components of an information handling system containing video displays implementing the method and apparatus of the present invention.

Referring to FIG. 1, the information handling system 100 includes a processor 102 and various other subsystems 108 understood by those skilled in the art. Data is transferred between the various system components via various data buses illustrated generally by bus 114. In selected embodiments of the invention, bus 114 comprises a PCIe bus. Unlike its PCI bus predecessor, the PCIe bus is a two point serial link, removing PCI's requirement of devices sharing bandwidth. PCIe transfers data at 250 MB/s per channel, or "lane," to a maximum of 32 lanes for a total combined transfer rate of 8 GB/s. The PCIe bus is also a full-duplex, allowing it to transfer data in both directions at once, effectively doubling the data transfer rate to 500 MB/s per lane, resulting in a combined transfer rate of 16 GB/s when all 32 lanes are employed.

Information handling system 100 further comprises a hard drive or other mass storage device 106, system memory 112, input/output (I/O) interface 104 operable to provide support for keyboard, mouse and video, and network port 110. In selected embodiments of the invention, I/O interface 104 comprises video display subsystem 116, which further comprises DisplayPort transmitter 118. DisplayPort transmitter 118 also comprises an electrical interface that is similar to the PCIe physical layer as described in greater detail herein. The DisplayPort connector 128 couples DisplayPort transmitter 118 to DisplayPort video receiver 132. The DisplayPort connector 128 comprises four DisplayPort video data lanes, a Hot Plug Detect channel, and an Auxiliary Channel for the communication of control data as described in greater detail hereinbelow.

FIGS. 2a-b are simplified block diagrams illustrating an implementation of a DisplayPort Auxiliary Channel in accordance with an embodiment of the invention. FIG. 2a is a prior art illustration of a DisplayPort source device 202 coupled via DisplayPort connector 128 to DisplayPort digital display 134. DisplayPort source device 202 comprises DisplayPort transmitter 118, which communicates video display information to DisplayPort receiver 132 via DisplayPort connector 128. DisplayPort connector 128 comprises a unidirectional main link 204, a bi-directional Auxiliary Channel 206, and a unidirectional Hot Plug Detect (HPD) link 208. The main link 204 comprises a uni-directional, high-bandwidth, low-latency channel used for transport of isochronous data streams such as uncompressed video and audio. The Auxiliary Channel 206 comprises a half-duplex bidirectional channel used for link management and device control. The HPD signal 208 serves as an interrupt request by the DisplayPort digital display 134.

FIG. 2b is an expanded prior art illustration of the DisplayPort elements described in FIG. 2a. In this illustration, the main link comprising the DisplayPort connector 128 further comprises AC-coupled, doubly terminated communication DisplayPort channels, or "lanes," '0' 210, '1' 212, '2' 214, and '3' 216. AC-coupling facilitates communication between DisplayPort transmitter 118 and DisplayPort receiver 132, as they may have different common mode voltages. Link rates of 2.7 Gbps and 1.62 Gbps are supported for each lane. Link rates are determined by the capabilities of the DisplayPort transmitter 118 and receiver 132, and the quality of the DisplayPort connector 128 that is implemented.

The main link 204 comprises DisplayPort '0' 210, '1' 212, '2' 214, and '3' 216, all of which carry video data. DisplayPort source device 202 and DisplayPort display 134 are operable to support the minimum number of lanes required for their needs. DisplayPort devices (e.g., display 134) that support two lanes are required to support both one and two lanes, while those devices that support four lanes are required to support one, two, and four lanes. DisplayPort connector 128 is required to support four lanes for maximizing the interoperability between the DisplayPort source device 202 and the DisplayPort display 134. The auxiliary (AUX) channel 206 comprises an AC-coupled, doubly terminated channel that is half-duplex and bi-directional. The AUX channel is used for link management between the DisplayPort source device 202 and the DisplayPort display 134. Upon a hot plug detect (HPD) event, DisplayPort source device 202 reads the capability of the DisplayPort display 134 and configures the main link 204 through link training. Handshakes commence between DisplayPort transmitter 118 and receiver 132 through the AUX channel 206 to enable the appropriate number of lanes required to support the desired link rate at required drive current and equalization levels. During operation following link training, DisplayPort receiver 132 may generate a notification of link status change, such as loss of synchronization, by toggling an HPD signal, thus sending an interrupt request. DisplayPort transmitter 118 then checks the link status via the AUX channel and takes corrective action. In selected embodiments of the invention, device-level applications such as Extended Display Identification Data (EDID) and Monitor Control Command Set (MCCS) are implemented through AUX channel read/write operations. These read/write operations communicate control data to DisplayPort source device 202 and other DisplayPort devices to perform predetermined control operations that do not require user intervention.

FIG. 3 is a generalized block diagram of a DisplayPort source device 202 and receiver 134 as implemented in accordance with an embodiment of the invention to use DisplayPort Auxiliary Channel to communicate control data.

In selected embodiments, DisplayPort source device 202 comprises physical layer 302, link layer 318, stream sources 334, stream policy maker 336, and link policy maker 338. The DisplayPort display 134 similarly comprises physical layer 310, link layer 326, stream sources 344, stream policy maker 342, link policy maker 340, DisplayPort configuration data (DPCD) 346, and extended display identification data (EDID) 348.

PHY layer 302 comprises auxiliary channel 306, HPD channel 308, host main link interface 304, and DisplayPort transmitter 118. Link layer 318 comprises isochronous transport services 320, AUX channel device services 322 and AUX channel link services 324. The link layer 318 provides services as requested by the stream policy maker 336, which manages how to transport the DisplayPort video stream, and link policy maker 338, which manages the link and is responsible for keeping the link synchronized.

The PHY layer 310 of DisplayPort display 134 similarly comprises auxiliary channel interface 314, HPD channel 312, display main link interface 316, and DisplayPort receiver 132. The link layer 326 of DisplayPort display 134 similarly comprises isochronous transport services 332, AUX channel device services 330, and AUX channel link services 328. As in the DisplayPort source device 202, the link layer 326 provides services as requested by the stream policy maker 342, which manages how to transport the DisplayPort video stream, and link policy maker 340, which manages the link and is responsible for keeping the link synchronized.

As described in greater detail herein, stream source(s) 334 video signal information is transported via isochronous transport services 320 to DisplayPort transmitter 118 for conveyance by host main link interface 304. DisplayPort video signal information 204 is then conveyed over DisplayPort connector 128, which comprises DisplayPort lanes '0' through '4,' to display main link interface 316. Once received, the DisplayPort video signal information is conveyed from display main link interface 316 to DisplayPort receiver 132. Isochronous transport services 332 then conveys the DisplayPort video signal information to be presented as stream sources 344 on the DisplayPort display 134.

In selected embodiments of the invention, the DisplayPort source device 202 is the master of AUX channel 206 and the DisplayPort display 134 is the slave. Activation of the DisplayPort source device 202 results in the initiation of a request transaction, to which the DisplayPort display 134 responds with a reply transaction. In one embodiment, the DisplayPort display 134 AUX channel interface 314 is in a listen mode and detects the activation of the DisplayPort source device 202 by monitoring the DisplayPort power voltage. Activation of the DisplayPort source device 202 through user action such as pressing a power switch or inserting media to be played results in a change in the DisplayPort power voltage. This change in the DisplayPort power voltage results in the generation of a hot plug detect (HPD) event by DisplayPort display 134, which is communicated via HPD interface 312. The HPD event signal is received by HPD interface 308, and is then communicated via AUX channel link services 324 to the link policy maker 338.

The stream policy maker 336 in turn initiates an Extended Display Identification Data (EDID) read operation, which is conveyed via the AUX channel device services 322 to the AUX channel interface 306. After its receipt, the EDID read operation is conveyed as command data 350 via AUX channel 206 to the AUX channel interface 314 of the DisplayPort display 134. Once received by the AUX channel interface 314, the EDID read operation comprising the command data 350 is conveyed by the AUX channel device services 330 to the stream policy maker 342. The stream policy maker 342 then performs an EDID operation to retrieve the EDID information 348 stored in the DisplayPort display 134. The retrieved EDID information 348 is then returned by the stream policy maker 342 of the DisplayPort display 134 to the stream policy maker 336 of the DisplayPort source device 202 via the previously used path.

Once received, the stream policy maker 336 initiates a link inquiry to the link policy maker 338, which initiates a DisplayPort Configuration Data (DPCD) read operation. The DPCD read operation is conveyed via the AUX channel link services 324 to the HPD interface 308. After its receipt, the DPCD read operation is conveyed to the HPD interface 312 of the DisplayPort display 134. Once received by the HPD interface 312, the DPCD read operation is conveyed by the AUX channel link services 328 to the link policy maker 340. The link policy maker 340 then performs a DPCD read operation to retrieve the DPCD information 316 stored in the DisplayPort display 134. The retrieved DPCD information 346 is then returned by the link policy maker 340 of the DisplayPort display 134 to the link policy maker 338 of the DisplayPort source device 202 via the previously used path.

Once received, the link policy maker 338 initiates link initialization and link training operations. These operations are described in greater detail in "DisplayPort Standard, Version 1.0," published on May 1, 2006, by the Video Electronic Standards Association (hereinafter referred to as the VESA DisplayPort specification), which by this reference is incorporated herein for all purposes. Once DisplayPort link initialization and link training operations are performed, control operations are initiated using the VESA Monitor Control Command Set (MCCS) to perform read/write operations through the AUX channel 206. These read/write operations communicate control data to DisplayPort source device 202 and other DisplayPort devices to perform predetermined control operations that do not require user initiation or intervention.

Figure 4:
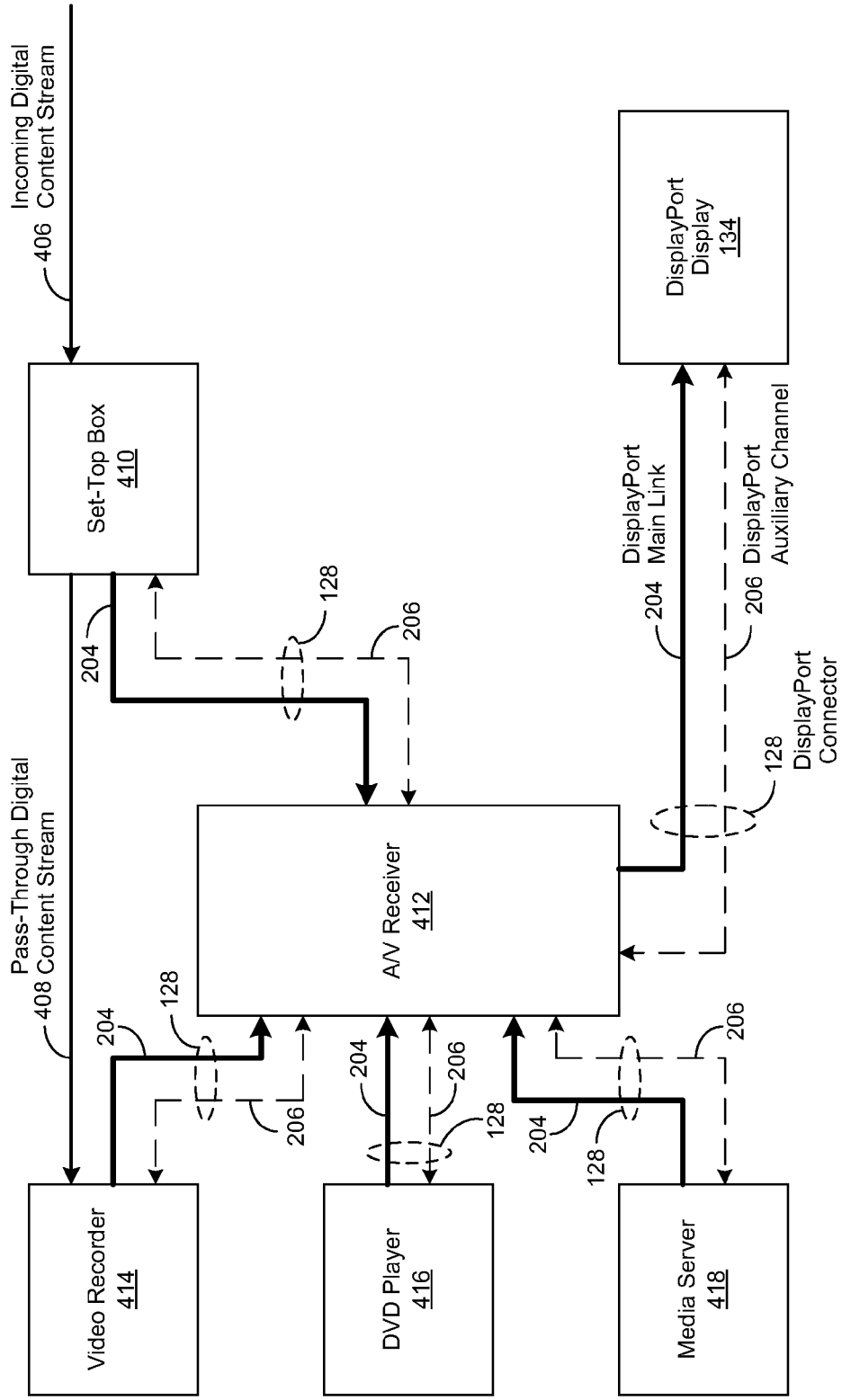
FIG. 4 is a simplified block diagram illustrating device control data communicated through a DisplayPort Auxiliary Channel in accordance with the present invention.

FIG. 4 is a simplified block diagram illustrating device control data communicated through a DisplayPort Auxiliary Channel in accordance with the present invention. In selected embodiments, an incoming digital content stream 406 is received by the set-top box (STB) 410 and conveyed as a pass-through digital content stream 408 to video recorder 414. Set-top box 410, video recorder 414, DVD player 416, media server 418, AVR 412, and DisplayPort display 134 are coupled via DisplayPort connectors 128 for the conveyance of audio, video, and control data as described in greater detail herein. In these and other embodiments, DisplayPort connector 128 comprises DisplayPort main link 204 for the conveyance of audio and video data and DisplayPort Auxiliary (AUX) channel 206 for the conveyance of control data.

As described in greater detail herein, read/write operations communicate control data between source devices 410, 414, 416, 418, AVR 412 and DisplayPort display 134 to perform predetermined control operations that do not require user initiation or intervention. In one embodiment, a user initiates operation of an A/V system by inserting a DVD into DVD player 416. The insertion of the DVD generates a hot plug detect (HPD) event resulting in an HPD notice, which is conveyed via AUX channel 206 from the DVD player 416 to the AVR 412. Upon receipt of the HPD notice, Extended Display Identification Data (EDID) read operations are performed and the EDID information of the AVR 412 is conveyed to the DVD player 416. Upon receipt of the EDID information by the DVD player 416, DisplayPort Configuration Data (DPCD) read operations are then performed.

These read operations result in the training of the DisplayPort main link 204 for the conveyance of video and control data as described in greater detail herein. Once the DisplayPort main link 204 has been trained, Monitor Control Command Set (MCCS) control operations are performed to activate the DisplayPort display 134 and select AVR 412 as the DisplayPort source device. Upon selection of AVR 412 as the DisplayPort source device, additional training of the DisplayPort main link 204 results in the DVD player 416 using the AVR 412 as a repeater device to convey the stream source contained in DVD to the DisplayPort display 134 for presentation. It will be apparent to those of skill in the art that the MCCS control operations performed by the DVD player 416 and conveyed over AUX channel 206 to the AVR 412 result in the activation of AVR 412 and DisplayPort display 134. Once activated, DisplayPort display 134 selects the correct input to receive stream source from the AVR 412, which acts as a repeater DisplayPort device for the DVD player 416, without user initiation or intervention.

FIG. 5 is a generalized flowchart illustrating the communication of control data between two DisplayPort devices in accordance with the present invention. In this embodiment, a user begins start-up operations of an audio/visual (A/V) system in step 502 by inserting a DVD into a DVD player in step 504. The insertion of the DVD generates a hot plug detect (HPD) event resulting in an HPD notice, which is conveyed from the DVD player to the DisplayPort display in step 506 via the Auxiliary (AUX) channel of a DisplayPort connection. Upon receipt of the HPD notice, the DisplayPort display is activated in step 506 and DisplayPort DVD input is selected.

Once DisplayPort DVD input is selected, Extended Display Identification Data (EDID) read operations are performed in step 508. If the EDID information is not read in step 510, then the EDID read operations are repeated, beginning in step 508. Otherwise the EDID information read from the DisplayPort display is conveyed to the DVD player. Upon receipt of the EDID information by the DVD player, DisplayPort Configuration Data (DPCD) read operations are then performed.

These read operations result in the training of the DisplayPort main link in step 512 for the conveyance of video and control data as described in greater detail herein. Once the DisplayPort main link has been trained, Monitor Control Command Set (MCCS) control operations are performed to activate the DisplayPort display and select the DVD as the DisplayPort source device. Upon selection of the DVD as the DisplayPort source device, additional training of the DisplayPort main link results in the DVD player conveying the stream source contained in the DVD to the DisplayPort display for presentation in step 514. Upon commencement of the presentation of the stream source contained in the DVD, A/V system start-up operations end in step 516.

FIG. 6 is a generalized flowchart illustrating the communication of control data between a plurality of DisplayPort devices in accordance with the present invention. In this embodiment, a user begins start-up operations of an audio/visual (A/V) system in step 602 by inserting a DVD into a DVD player in step 604. The insertion of the DVD generates a hot plug detect (HPD) event resulting in an HPD notice, which is conveyed from the DVD player to an A/V receiver (AVR) in step 606 via the Auxiliary (AUX) channel of a DisplayPort connection. Upon receipt of the HPD notice, the AVR is activated in step 606 and DisplayPort DVD input is selected.

Once DisplayPort DVD input is selected, Extended Display Identification Data (EDID) read operations are performed in step 608. If the EDID information is not read in step 610, then the EDID read operations are repeated, beginning in step 608. Otherwise the EDID information read from the AVR is conveyed to the DVD player. Upon receipt of the EDID information by the DVD player, DisplayPort Configuration Data (DPCD) read operations are then performed. These read operations result in the training of the DisplayPort main link in step 612 for the conveyance of video and control data as described in greater detail herein. Once the DisplayPort main link has been trained, Monitor Control Command Set (MCCS) control operations are performed to activate the AVR and select the DVD player as the DisplayPort source device.

Upon selecting the DVD player as the DisplayPort device, a hot plug detect (HPD) event results in an HPD notice, which is conveyed to the A/V receiver (AVR) from the DisplayPort display in step 614 via the Auxiliary (AUX) channel of a DisplayPort connection. Upon receipt of the HPD notice, the DisplayPort display is activated in step 616 and DisplayPort AVR input is selected. Once DisplayPort AVR input is selected, Extended Display Identification Data (EDID) read operations are performed in step 618. If the EDID information is not read in step 620, then the EDID read operations are repeated, beginning in step 618.

Otherwise the EDID information read from the DisplayPort display is conveyed to the AVR. Upon receipt of the EDID information by the AVR, DisplayPort Configuration Data (DPCD) read operations are then performed. These read operations result in the training of the DisplayPort main link in step 622 for the conveyance of video and control data as described in greater detail herein. Once the DisplayPort main link has been trained, Monitor Control Command Set (MCCS) control operations are performed to activate the DisplayPort display and select the AVR as the DisplayPort source device.

Upon selection of the AVR as the DisplayPort source device, additional training of the DisplayPort main link results in the DVD player conveying the stream source contained in the DVD, through the AVR, to the DisplayPort display for presentation in step 624. Upon commencement of the presentation of the stream source contained in the DVD, A/V system start-up operations end in step 626. It will be apparent to those of skill in the art that the MCCS control operations performed by the DVD player and conveyed over AUX channel to the AVR result in the activation of AVR and DisplayPort display. Once activated, the DisplayPort display selects the correct input to receive stream source from the AVR, which acts as a repeater DisplayPort device for the DVD player without user initiation or intervention.

Although the present invention has been described in detail, it should be understood that various changes, substitutions and alterations can be made hereto without departing from the spirit and scope of the invention as defined by the appended claims.

What is claimed is:

1. An information handling system, comprising:
    data processing logic configured to process a first data stream of video data for a video display and a second data stream of non-video control data for a plurality of source devices, wherein said plurality of source devices are configured to transfer said video data to said video display;
    a data transfer interface comprising a plurality of data channels, said data transfer interface operably coupled to said video display and said plurality of source devices, wherein said data transfer interface comprises a Video Electronics Standards Association (VESA) DisplayPort interface and said plurality of data channels comprises a VESA DisplayPort main link and a VESA DisplayPort auxiliary channel; and
    control logic configured to use a first subset of said plurality of data channels to transfer said first data stream to said video display and to use a second subset of said plurality of data channels to transfer said second data stream to said plurality of source devices;
    wherein said control logic is used to perform Extended Display Identification Data (EDID) read operations on said video display to retrieve its EDID information upon activation of an individual source device of the plurality of source devices, and
    wherein said EDID information is used by said individual source device to perform DisplayPort Configuration (DPCD) read operations to train said VESA DisplayPort main link for the conveyance of said video data and said non-video control data between said video display and said individual source device;
    wherein said auxiliary channel is configured to transfer said second data stream of non-video control data in accordance with VESA monitor command control set (MCCS) parameters; and
    MCCS operations are performed once said VESA DisplayPort main link has been trained, wherein said performance of MCCS operations activates said video display and selects said individual source device for operation without the performance of an initiating action or an intervention action by a user.

2. The information handling system according to claim 1, wherein said control logic is operable to transfer said second data stream in accordance with the VESA DisplayPort standard.

3. The information handling system according to claim 1, wherein said second data stream of non-video control data is used to perform read/write operations.

4. The information handling system of claim 1, wherein said second data stream of non-video control data is used to control the plurality of source devices.

5. A method of managing data transfer between an information handling system and a source device, comprising:
    using data processing logic configured to process a first data stream of video data for a video display and a second data stream of non-video control data for a plurality of source devices, wherein said plurality of source devices are configured to transfer said video data to said video display;
    using a data transfer interface comprising a plurality of data channels, said data transfer interface operably coupled to said video display and said plurality of source devices, wherein said data transfer interface comprises a Video Electronics Standards Association (VESA) DisplayPort interface and said plurality of data channels comprises a VESA DisplayPort main link and a VESA DisplayPort auxiliary channel; and
    using control logic configured to use a first subset of said plurality of data channels to transfer said first data stream to said video display and to use a second subset of said plurality of data channels to transfer said second data stream to said plurality of source devices;
    wherein said control logic is used to perform Extended Display Identification Data (EDID) read operations on said video display to retrieve its EDID information upon activation of an individual source device of the plurality of source devices, and
    wherein said EDID information is used by said individual source device to perform DisplayPort Configuration (DPCD) read operations to train said VESA DisplayPort main link for the conveyance of said video data and said non-video control data between said video display and said individual source device;
    wherein said auxiliary channel is configured to transfer said second data stream of non-video control data in accordance with VESA monitor command control set (MCCS) parameters; and
    MCCS operations are performed once said VESA DisplayPort main link has been trained, wherein said performance of MCCS operations activates said video display and selects said individual source device for operation without the performance of an initiating action or an intervention action by a user.

6. The method according to claim 5, wherein said control logic is operable to transfer said second data stream in accordance with the VESA DisplayPort standard.

7. The method according to claim 5, wherein said second data stream of non-video control data is used to perform read/write operations.

8. The method of claim 5, wherein said second data stream of non-video control data is used to control the plurality of source devices.

9. A system for managing data transfer between an information handling system and a plurality of source devices, comprising:
    a data transfer interface comprising a plurality of data channels, wherein said data transfer interface is configured to be coupled to said information handling system, said plurality of source devices and a video display, said data transfer interface comprising a Video Electronics Standards Association (VESA) DisplayPort interface and said plurality of data channels comprising a VESA DisplayPort main link and a VESA DisplayPort auxiliary channel; and control logic configured to use a first subset of said plurality of data channels to transfer a first data stream of video data to said video display and to use a second subset of said plurality of data channels to transfer a second data stream of non video control data to said plurality of source devices, wherein said plurality of source devices are configured to transfer said video data to said video display;

wherein said control logic is used to perform Extended Display Identification Data (EDID) read operations on said video display to retrieve its EDID information upon activation of an individual source device of the plurality of source devices, and wherein said EDID information is used by said individual source device to perform DisplayPort Configuration (DPCD) read operations to train said VESA DisplayPort main link for the conveyance of said video data and said non-video control data between said video display and said individual source device;

wherein said auxiliary channel is configured to transfer said second data stream of non-video control data in accordance with VESA monitor command control set (MCCS) parameters; and MCCS operations are performed once said VESA DisplayPort main link has been trained, wherein said performance of MCCS operations activates said video display and selects said individual source device for operation without the performance of an initiating action or an intervention action by a user.

10. The system according to claim 9, wherein said control logic is operable to transfer said second data stream in accordance with the VESA DisplayPort standard.

11. The system according to claim 9, wherein said second data stream of non-video control data is used to control the plurality of source devices.

* * * * *